Patented May 19, 1931

1,806,029

UNITED STATES PATENT OFFICE

CARL THEODOR THORSSELL, OF CASSEL, GERMANY

PROCESS FOR WORKING UP CRUDE PHOSPHATE AND POTASSIUM SALTS TO MIXED FERTILIZER

No Drawing. Application filed August 7, 1930, Serial No. 473,778, and in Germany August 14, 1929.

As is well known crude phosphate may advantageously be worked up by disintegrating it with nitric acid in presence of potassium sulphate.

$$Ca_3(PO_4)_2 + 3K_2SO_4 + 6HNO_3 = 3CaSO_4 + 6KNO_3 + 2H_3PO_4.$$

The gypsum is separated from the solution of potassium nitrate and phosphoric acid obtained in this manner by decantation or filtration and the solution is further worked up to a complete fertilizer by neutralization with ammonia and evaporation or in some other manner.

This method of working up crude phosphate appears very simple and promising but serious obstacles stand in its way.

In the first place the reaction does not proceed so simply as is to be assumed from the above equation, since not only gypsum but double compounds of potassium and calcium with sulphuric acid are also formed, such as syngenite ($K_2SO_4 + CaSO_4 + H_2O$) and potassium pentacalcium sulphate $$(K_2SO_4.5CaSO_4.H_2O).$$

In this way loss of potassium occurs which makes the process more expensive and renders it less profitable or unprofitable.

A further obstacle is that potassium sulphate is in itself a too valuable raw material for this process. The invention describes a process by means of which the utilization of the above reaction for working up crude phosphates is rendered possible without the said disadvantages obtaining.

According to the present invention potassium sulphate is not used as raw material but the cheaper potassium chloride or sylvinite, potassium sulphate first of all being obtained as an intermediate product from the potassium chloride or sylvinite by the already known decomposition with ammonium sulphate in ammoniacal solution. The ammonium sulphate necessary for this reaction is continuously recovered from the gypsum obtained by the disintegration of the crude phosphate by decomposition with ammonium carbonate in ammonium chloride solution.

When potassium chloride is used as the raw material the process proceeds as follows:

Potassium chloride is stirred into an ammonium chloride solution which contains ammonium sulphate in quantity equivalent to the potassium, and ammonia is led in. Potassium sulphate is then obtained as a precipitate in an ammoniacal ammonium chloride solution. These products, solid potassium sulphate and ammoniacal ammonium chloride, solution are separated from one another and each separately further worked up as follows:

The potassium sulphate is used for disintegration of crude phosphate according to the equation given above, gypsum and a solution of potassium nitrate and phosphoric acid being obtained. The gypsum, which also contains double salts of potassium and calcium with sulphuric acid, is separated off and the solution worked up to a complete fertilizer by neutralization with ammonia and evaporation or in some other manner.

The ammoniacal ammonium chloride liquor, obtained in the above described production of potassium sulphate, is cooled in order to separate out a part of the ammonium chloride, and into the mother liquor, obtained after separation of the ammonium chloride precipitated by cooling, carbonic acid is led in order to form ammonium carbonate. Into the ammonium chloride liquor containing ammonium carbonate obtained in this way, the gypsum obtained from the disintegration of the crude phosphate is stirred, whereby, in consequence of the increased solubility of the gypsum in ammonium chloride solution, it is smoothly converted into ammonium sulphate and calcium carbonate. The calcium carbonate is separated off and is thrown on to the scrap head or is used for other purposes, e. g. for the production of nitrate of lime. As mentioned in the introduction, the potassium chloride for forming further quantities of potassium sulphate is stirred into the mother liquor, which now consists of an ammonium chloride solution containing ammonium sulphate, ammonia also being led in and so on.

Consequently the process is carried out in an enclosed cycle, potassium chloride, nitric acid, ammonia, carbonic acid and crude phosphate being used as raw materials and a solution of potassium nitrate and phosphoric acid, which can be worked up to various products, and ammonium chloride being obtained as products.

When sylwinite is used as the raw material the process proceeds as follows.

The crude salt is stirred into an ammonium chloride solution containing ammonium sulphate in quantity equivalent to the potassium, ammonia also being led in.

Glaserite and potassium chloride are thereby obtained as precipitates in an ammoniacal ammonium chloride-sodium chloride solution. These products, glaserite-potassium chloride and ammoniacal ammonium chloride-sodium chloride solution, are separated and each separately worked up as follows:

The mixed salt of glaserite and potassium chloride is stirred up with cold water, whereby solid potassium sulphate and a solution of sodium chloride are obtained which is introduced again into the process. The potassium sulphate is used for the disintegration of crude phosphate, as described above, whereby gypsum containing potassium calcium sulphate is obtained.

The ammonium chloride-sodium chloride solution is cooled in order to separate out a part of the ammonium chloride and the mother liquor of this ammonium chloride is subjected to the Solvay process. After separation of the sodium bicarbonate the mother liquor of the same, which contains ammonium chloride and ammonium carbonate, is stirred up with the gypsum obtained by the disintegration of the crude phosphate and the calcium carbonate which is formed is separated off. Into the liquor which is obtained in this manner, and which contains ammonium sulphate and ammonium chloride, the crude salt is again stirred and so forth.

Naturally the process may also be worked with a larger quantity of sulphuric acid in circulation than is equivalent to the potassium, so that the precipitate does not consist of a mixture of glaserite and potassium chloride, but only of glaserite or even of a mixture of glaserite with sodium sulphate, and this salt may be used for the disintegration of phosphate, whereby a solution of potassium nitrate, sodium nitrate and phosphoric acid is obtained. In certain circumstances. one may even work so as to depress the potassium content of the finished mixed fertilizer so that the ratio between $K_2O$ and $N$ is the correct one for the given purpose.

Consequently the process is carried out in an enclosed cycle, sylvinite, nitric acid, ammonia, carbonic acid and crude phosphate being used as raw materials, and a solution of potassium nitrate or potassium and sodium nitrate and phosphoric acid, ammonium chloride and soda being obtained as products.

The ammonia may be dispensed with as a raw material should this be desirable by recovering it by expulsion from the ammonium chloride, just as is generally usual in the manufacture of soda, in which case therefore, ammonium chloride is no longer a product.

Having now particularly described and ascertained the nature of my said invention and in what manner the same is to be performed, I declare that what I claim is:

1. A process for working up crude phosphates and potassium salts into mixed fertilizers, consisting in stirring a liquor consisting of ammonium carbonate and ammonium chloride obtained in the process, with gypsum, also obtained in the process, separating off the calcium carbonate formed, treating the remaining liquor with potassium chloride and ammonia, thus precipitating potassium sulphate, employing the latter for the disintegration of crude phosphate with nitric acid in such a concentration as to produce a solution of potassium nitrate and phosphoric acid together with gypsum, further treating this solution to obtain a mixed fertilizer, the mother liquor from the potassium sulphate being cooled for the purpose of separating out a part of the ammonium chloride and saturated with carbonic acid, whereupon the gypsum obtained is stirred in as set forth.

2. A process for working up crude phosphates and potassium salts into mixed fertilizers, consisting in stirring a liquor consisting of ammonium carbonate and ammonium chloride obtained in the process, with gypsum, also obtained in the process, separating off the calcium carbonate formed, treating the remaining liquor with crude sylvinite salts and ammonia thus precipitating glaserite and potassium chloride, treating the same with water, to separate potassium sulphate, employing the latter for the disintegration of crude phosphate with nitric acid, cooling the potassium sulphate mother liquor to separate out a portion of the ammonium chloride and subjecting the resulting liquor to the Solvay process, the liquor remaining behind from this process being stirred with the gypsum obtained in the disintegration of the crude phosphate, as set forth.

3. A process as claimed in claim 1 and in which a crude sylvinitic salt is used and is worked in circulation with a quantity of sulphuric acid equivalent to the total quantity of potassium and sodium, whereby during the disintegration of the crude phosphate, a solution of potassium nitrate, sodium nitrate and phosphoric acid is obtained, which is further worked up to a mixed fertilizer, as set forth.

In testimony whereof I have signed my name to this specification.

CARL THEODOR THORSSELL.